United States Patent
O'Dell et al.

(10) Patent No.: US 12,146,743 B2
(45) Date of Patent: Nov. 19, 2024

(54) SUPERSONIC FLIGHT NAVIGATION BASED ON POPULATION DENSITY

(71) Applicant: Gulfstream Aerospace Corporation, Savannah, GA (US)

(72) Inventors: Robert O'Dell, Savannah, GA (US); Robert Cowart, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 999 days.

(21) Appl. No.: 16/947,807

(22) Filed: Aug. 18, 2020

(65) Prior Publication Data

US 2022/0057214 A1 Feb. 24, 2022

(51) Int. Cl.
*G01C 21/20* (2006.01)
*B64C 30/00* (2006.01)
(Continued)

(52) U.S. Cl.
CPC .............. *G01C 21/20* (2013.01); *B64C 30/00* (2013.01); *G01C 21/165* (2013.01); *G01C 23/00* (2013.01); *G08G 5/006* (2013.01); *G01H 17/00* (2013.01)

(58) Field of Classification Search
CPC ...... G01C 21/20; G01C 21/165; G01C 23/00; B64C 30/00; G08G 5/006; G08G 5/0013; G08G 5/0021; G08G 5/0052; G08G 5/0039; G01H 17/00
USPC .. 701/3, 14, 120, 301, 533, 4, 532, 408, 16, 701/472, 300, 469, 468, 9, 1, 467, 400, 701/409, 410, 431, 454, 2, 500, 528, 11, 701/10, 411, 23, 8, 15, 465, 433, 18, 491, 701/122, 428, 7, 117, 25, 423, 470, 480, 701/538, 438, 121, 501, 36, 412, 13, 426, 701/487, 26, 439, 537, 28, 436, 457, 484, 701/522, 414, 514, 123, 521, 418, 302, 701/494, 450, 416, 24, 479, 446, 448, 701/518, 41, 495, 29.1, 415, 520, 482, 701/492, 430, 424, 6, 70, 540, 534, 45, 701/32.4, 49, 417, 477, 509, 530, 507, 701/421, 29.3, 31.5, 422, 489, 118, 435, 701/503, 536, 413, 504, 96, 37, 443, 119, 701/432, 513, 515, 440, 483, 508, 419,
(Continued)

(56) References Cited

U.S. PATENT DOCUMENTS

| | | | |
|---|---|---|---|
| 10,209,122 B1 * | 2/2019 | Suddreth .............. | G08G 5/0017 |
| 2005/0098681 A1 * | 5/2005 | Berson ................. | G08G 5/0052 244/1 N |
| 2018/0061245 A1 * | 3/2018 | Adler ................... | G08G 5/0043 |

* cited by examiner

*Primary Examiner* — Anne Marie Antonucci
*Assistant Examiner* — Jodi Jones
(74) *Attorney, Agent, or Firm* — Lorenz & Kopf, LLP (57) ABSTRACT

Flight control systems, flight control methods, and aircraft navigation systems and methods are provided. A method for estimating a sound level at a geographical location including determining, by an aircraft navigational processor, an initial navigational route, estimating, by the aircraft navigational processor, the sound level at the geographical location in response to a first sound pressure wave estimated to be generated by the aircraft at a first point along the initial navigational route and a second sound pressure wave generated by the aircraft at a second point along the initial navigational route, determining, by the aircraft navigational processor, an alternate navigational route in response to the sound level exceeding a noise limit at the geographical location, and displaying, by a user interface, the alternate navigational route and an alert indicative of the sound level exceeding the noise limit.

18 Claims, 3 Drawing Sheets

(51) Int. Cl.
*G01C 21/16* (2006.01)
*G01C 23/00* (2006.01)
*G01H 17/00* (2006.01)
*G08G 5/00* (2006.01)

(58) Field of Classification Search
USPC ........ 701/442, 486, 525, 19, 34.4, 447, 451,
701/478.5, 512, 99, 27, 437, 449, 458,
701/476, 485, 488, 490, 51, 535, 22,
701/29.4, 32.3, 32.7, 33.2, 441, 493, 502,
701/29.6, 30.2, 32.9, 462, 471, 473, 478,
701/506, 529, 116, 124, 20, 32.2, 33.1,
701/42, 460, 474, 499, 531, 93, 111, 12,
701/32.5, 32.6, 38, 475, 497, 539, 66,
701/100, 102, 32.1, 34.3, 481, 511, 103,
701/33.6, 34.2, 429, 444, 459, 47, 498,
701/29.2, 31.1, 32.8, 33.9, 79, 110, 114,
701/115, 29.5, 29.8, 30.4, 30.9, 31.9, 55,
701/60, 63, 82, 91, 29.7, 30.3, 30.5, 33.7,
701/33.8, 34.1, 40, 48, 496, 53, 65
See application file for complete search history.

SUPERSONIC FLIGHT NAVIGATION BASED ON POPULATION DENSITY

TECHNICAL FIELD

The technical field relates generally to navigation systems for supersonic aircraft, and more particularly relates to aircraft navigation, aircraft propulsion, navigation and propulsion algorithms, and aircraft equipped with electrically powered navigation and propulsion systems to provide navigational guidance when the aircraft is operating at supersonic speed over land.

BACKGROUND

Aircraft flying over population centers may cause undesirable noise for people living in those population centers. This is particularly true for supersonic flight where sound pressure waves begin to overlap as the aircraft approaches the speed of sound. As the aircraft reaches the speed of sound, the sound pressure waves combine creating a sonic boom which may result in unacceptable noise levels to people on the ground, upset livestock and cause physical damage to manmade and natural structures.

To compound this problem, focusing of sonic booms may occur when an aircraft traveling at supersonic speeds changes direction or accelerates, resulting in points of overlapping sonic booms with additive amplitudes which, in turn, yield even higher magnitude sonic booms ("focus booms") at these focus points. While supersonic aircraft are being redesigned to reduce the amplitude of their resulting sonic booms to levels acceptable for flight over land, the amplitude of focus booms cannot currently be sufficiently mitigated and remains unacceptable. As such, it is desirable to provide navigation and propulsion systems, navigation algorithms, and aircraft that provide convenient and improved navigation systems that consider location of the aircraft and resulting sonic boom signatures when the aircraft is operating at supersonic speeds. In addition, other desirable features and characteristics will become apparent from the subsequent summary and detailed description, and the appended claims, taken in conjunction with the accompanying drawings and this background.

The above information disclosed in this background section is only for enhancement of understanding of the background of the invention and therefore it may contain information that does not form the prior art that is already known in this country to a person of ordinary skill in the art.

SUMMARY

Disclosed herein are flight navigation systems, flight propulsion systems, control algorithms, aircraft and related control logic for provisioning aircraft, methods for making and methods for operating such systems, and other vehicles equipped with onboard control systems. By way of example, and not limitation, there is presented a navigation system for supersonic aircraft configured to calculate sonic boom focal zones and to generate an aircraft navigational route and maneuvers in response to the sonic boom focal zones, population density and other environmental considerations.

In a first non-limiting embodiment, an aircraft navigation system may include, but is not limited to a user interface configured to display at least one of an alert, an initial navigational route and an alternate navigational route, a sensor for detecting a heading of an aircraft, an altitude of the aircraft and a velocity of the aircraft, a memory configured for storing information indicative of a noise limit for a geographical location, and a processor configured to determine the initial navigational route, to estimate a sound level at the geographical location, and to determine an alternate navigational route in response to the sound level exceeding the noise limit, and to provide the alternate navigational route and an alert to the user interface In accordance with another aspect of the present disclosure, a method for controlling an aircraft in response to an estimation of a sound level at a geographical location including determining, by a processor on board the aircraft, an initial navigational route, estimating, by the processor, the sound level at the geographical location, determining, by the processor, an alternate navigational route in response to the sound level exceeding a noise limit at the geographical location, and displaying, by a user interface, the alternate navigational route and an alert indicative of the sound level exceeding the noise limit.

In accordance with another aspect of the present disclosure, a navigation system for guiding a supersonic aircraft traveling between an origin and a destination, the navigation system including an electronic storage device configured to store population information relating to a density of a human population disposed between an origin location and a destination, and a processor communicatively coupled with the electronic storage device, the processor configured to obtain the population information from the electronic second device, to estimate a sound level in response to the supersonic flight of the supersonic aircraft between the origin location and the destination, the processor further configured to calculate a route between the origin and the destination having a supersonic portion of the route corresponding to a supersonic flight of the supersonic aircraft, the supersonic portion of the route being based on the population information and the sound level, and processor still further configured to at least one of output the route to a pilot of the supersonic aircraft, output the route to a flight management system of the supersonic aircraft, output the route to an autopilot system of the supersonic aircraft, and control the supersonic aircraft to follow the route.

The above advantage and other advantages and features of the present disclosure will be apparent from the following detailed description of the preferred embodiments when taken in connection with the accompanying drawings.

BRIEF DESCRIPTION OF DRAWINGS

The above-mentioned and other features and advantages of this invention, and the manner of attaining them, will become more apparent and the system and method will be better understood by reference to the following description of embodiments of the invention taken in conjunction with the accompanying drawings.

The exemplifications set out herein illustrate preferred embodiments of the disclosure, and such exemplifications are not to be construed as limiting the scope of the disclosure in any manner.

DETAILED DESCRIPTION

The following detailed description is merely exemplary in nature and is not intended to limit the invention or the application and uses of the invention. Furthermore, there is no intention to be bound by any theory presented in the preceding background or the following detailed description. Various non-limiting embodiments of avionic navigation systems, avionic navigation algorithms, and aircraft are provided. In general, the disclosure herein describes a system and method for providing a supersonic flight navigation system for an aircraft operating at supersonic speeds over land.

Figure 1:
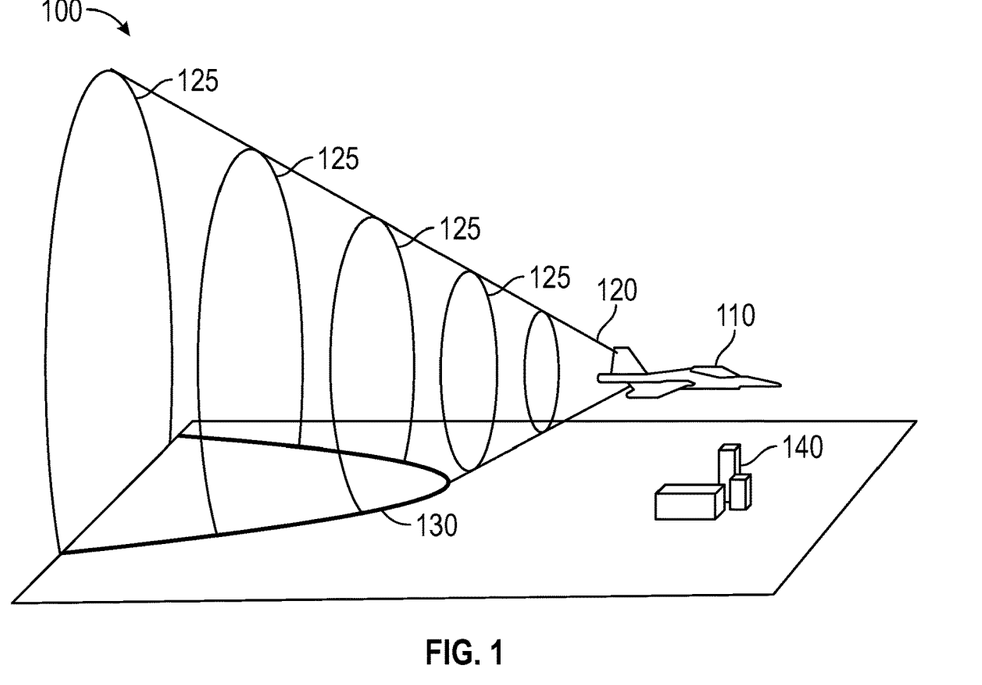
FIG. 1 is a schematic view illustrative of an exemplary operating environment for an aircraft employing a supersonic flight navigation system in accordance with the teachings of the present disclosure.

Turning now to FIG. 1, a perspective view of an exemplary environment 100 for use of a system and method for a supersonic flight navigation in accordance with an embodiment of the present disclosure is shown. The exemplary aircraft includes an aircraft 110 having an exemplary navigation system, In one exemplary embodiment, the navigation system may be configured to communicate with an autopilot system for the aircraft 110 operative to obtain data relating to population density to maneuver the aircraft in response to the data relating to population density in addition to weather, proximate air traffic, air traffic control (ATC) instructions, or for any other reason.

In one exemplary embodiment, the aircraft 110 is capable of traveling at supersonic speeds which may result in a sonic boom experienced by observers on the ground surface. A supersonic aircraft 110 is an aircraft capable of flying at speeds greater than the local speed of sound. As the aircraft 110 moves at or above supersonic speeds, sound pressure waves 125 are generated behind the aircraft 110. The sound pressure waves 125 propagate radially generating a conical sound from behind the aircraft having a cone angle 120 dependent on the speed of the aircraft 110. As the speed of the aircraft 110 increases, the cone angle 120 formed by the pressure waves 125 becomes narrower. As the pressure waves 125 intersect the ground surface, an observation contour 130 or "shock wave" is observed at the ground where the sonic boom is experienced. In addition, as the aircraft velocity increases, the cone angle 120 decreases decreasing the amplitude of the boom on the ground. As the aircraft moves forward at supersonic speeds, the sonic boom observation contour 130 is continuously generated forming a narrow path on the ground following the aircraft's flight path. This path is commonly referred to as a boom carpet. The boom carpet has a width dependent on the velocity and altitude of the aircraft. In addition, if the aircraft makes a sharp turn or pulls up then the boom may hit the ground in front of the aircraft.

Currently, supersonic flight over land is prohibited to avoid the adverse and/or disruptive effects of the sonic boom. Aircraft are being designed to minimize the magnitude of the sound pressure waves generated by the aircraft. In addition, flight paths, altitudes and velocities may be chosen to reduce the magnitude of sonic booms over sensitive areas, such as densely populated areas 140, locations with sensitive livestock, etc. However, when the aircraft 110 perform maneuvers at supersonic speeds, such as a turn, the observation contours 130 may overlap creating a focus boom. A focus boom is the point at which two portions of the observation contour 130 overlap thereby significantly increasing the amplitude of the pressure waves and increasing the magnitude of the resulting sound at that point. To address this problem, the exemplary system is configured to calculate whether a focus boom would occur in light of a planned upcoming maneuver and would create a necessary navigation decision point. In other words, the generation of a focus boom in combination with population densities or other areas with sound limitations could be a situation where the pilot may decide to alter the upcoming aircraft flight plan to avoid the focus boom occurrence.

In one exemplary embodiment, the method is configured to perform an algorithm to ensure that the focus boom is placed optimally on the ground at a desired location. These algorithms may predict the direction of propagation of a focus boom based on the maneuver or change in velocity of the aircraft and estimate a location of where the focus boom will intersect the ground. The exemplary method may then adjust the directional velocity of the aircraft, or provide the appropriate instructions to a pilot, such that the focus boom is located towards a desired location or away from an undesired location. In one exemplary embodiment, where an autopilot is employed by the aircraft, the autopilot may change aircraft directional headings, velocity, altitudes, or it may suggest such changes to the aircrew. The autopilot may be configured to automatically request approval from ATC to change course and then report results to the aircrew.

Figure 2:
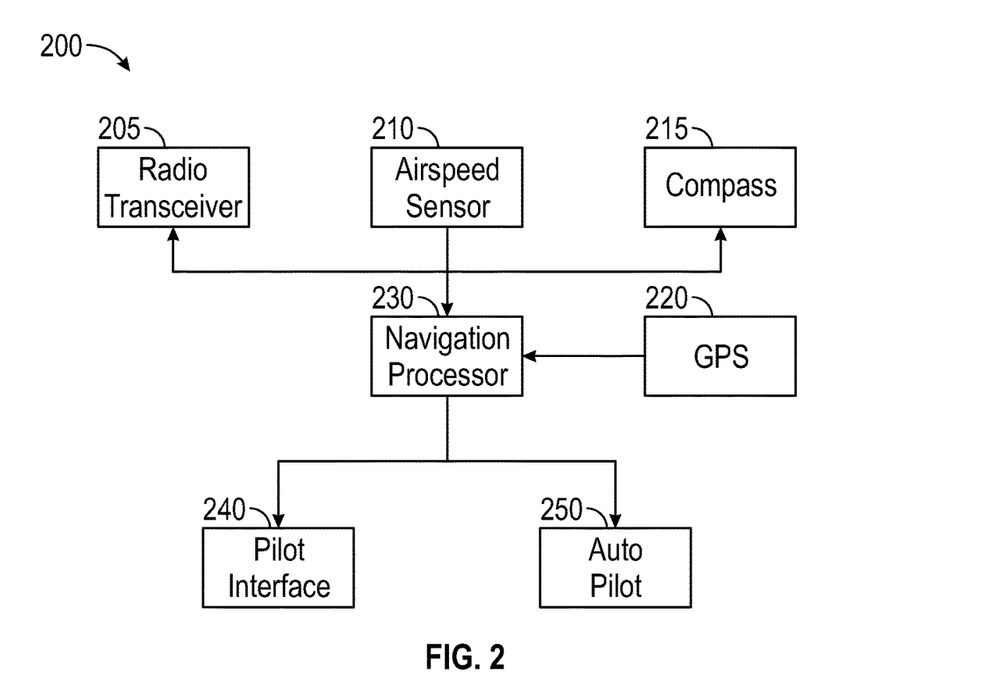
FIG. 2 is a block diagram illustrative of a supersonic flight navigation system in accordance with the teachings of the present disclosure.

Turning now to FIG. 2, a block diagram illustrative of an exemplary aircraft system 200 for supersonic flight navigation in accordance with an embodiment of the present disclosure is shown. The exemplary aircraft system 200 may include a radio transceiver 205, an airspeed sensor 210, a compass 215, a global positioning system (GPS) 220, a navigational processor 230, a pilot interface 240 and an auto pilot system 250.

The radio transceiver 205 is operative to transmit and receive information via a wireless transmission channel. The wireless transmission channel may be a radio frequency transmission channel having a carrier frequency modulated to carry voice, video and/or data information. In one exemplary embodiment, the radio transceiver 205 is configured to receive data indicative of ground feature information, such as population density of geographical locations, permitted noise levels in geographical locations, restricted airspace, and/or permitted noise levels at particular times for a geographical location. In one exemplary embodiment, the permitted noise levels or population densities may be stored in a memory coupled to the navigational processor 230 for use in determining a navigational route. The data indicative of ground feature information may then be updated periodically. The radio transceiver 205 may be further configured to transmit data and information from the aircraft via the wireless transmission channel to ground based information centers, such as air traffic control, data servers, and the like. The radio transceiver 205 may transmit data related to an aircraft position, velocity and orientation, about flight plans and requests for deviations from the flight plan. In one exemplary embodiment, the radio transceiver 205 may transmit a request to deviate from a current path between two way-points and to "go direct" from a current position to a third desired waypoint in order to reduce the total distance to be traveled between waypoints. In response, a ground-based air traffic controller may approve the request and transmit information related to population densities near the planned deviation point. These population densities may then be correlated to potential sonic boom or focus booms that may be generated in response to the deviation in order to determine if the deviation may be made at supersonic speeds.

The exemplary aircraft may further be equipped with a number of instruments and sensors for monitoring a wide range of flight conditions as well as the states of various flight equipment and systems. For example, an airspeed sensor 210 may be provided for calculating true airspeed based on pitot and static pressure and temperature data. A compass 215 may be provided for determining a heading of the aircraft and a GPS 220 for estimating a location, heading and velocity of the aircraft. In modern aircraft, attitude heading and reference systems (AHRS) have replaced gyroscopes, magnetic compasses and other instruments. An AHRS may receive data from MEMS devices, GPS, solid-state magnetometers and solid-state accelerometers and estimate attitude information such as roll, pitch and yaw in addition to aircraft heading. In this exemplary embodiment, the aircraft heading, location, altitude and velocity are provided to the navigational processor 230.

The navigational processor 230 is configured to estimate a location of sonic boom observation points in response to data provided by the aircraft instruments and sensors and data received via the radio transceiver 205. In one exemplary embodiment, the navigational processor 230 may be configured to estimate the observation points of sonic booms, estimate locations of focus booms in response to the estimated sonic boom observation points and planned aircraft maneuvers, and to provide feedback to aircraft control systems, auto pilot systems 250 and/or a pilot interface 240, such as a control panel display or the like. The navigational processor 230 may be further operative to calculate flight paths in response to pilot inputs and information received from air traffic control sources.

The pilot interface 240 is configured to provide navigational alerts to the aircraft pilot. The navigational alerts may be generated by the navigational processor and may be indicative of potential sonic booms and/or focus booms exceeding permissible levels within restricted areas, such as areas of high population density, areas with unstable geology, or other locations with noise restrictions. The pilot interface 240 may provide a visual display indicative of the navigational alert, audio alerts or a combination of both. The pilot interface 240 may further include an input device for receiving a pilot input, such as a button, touch screen, dial or the like. The input device may be used for receiving an acknowledgement of the navigational alert by the pilot or receiving an instruction from the pilot in response to the navigational alert.

The auto pilot system 250 is operative to generate instructions for use in controlling the aircraft along a predetermined flight path provided by the pilot or other external source. In one exemplary embodiment, the auto pilot system 250 may receive an indication of a request for a change in a flight path. The auto pilot system 250 may then provide the indication of the request to the navigational processor 240. In response, the navigational processor may provide a confirmation to perform the request in response to an estimation of the sonic boom observation points and levels performed by the navigational processor 230 and/or a pilot input received via the pilot interface 240.

Figure 3:
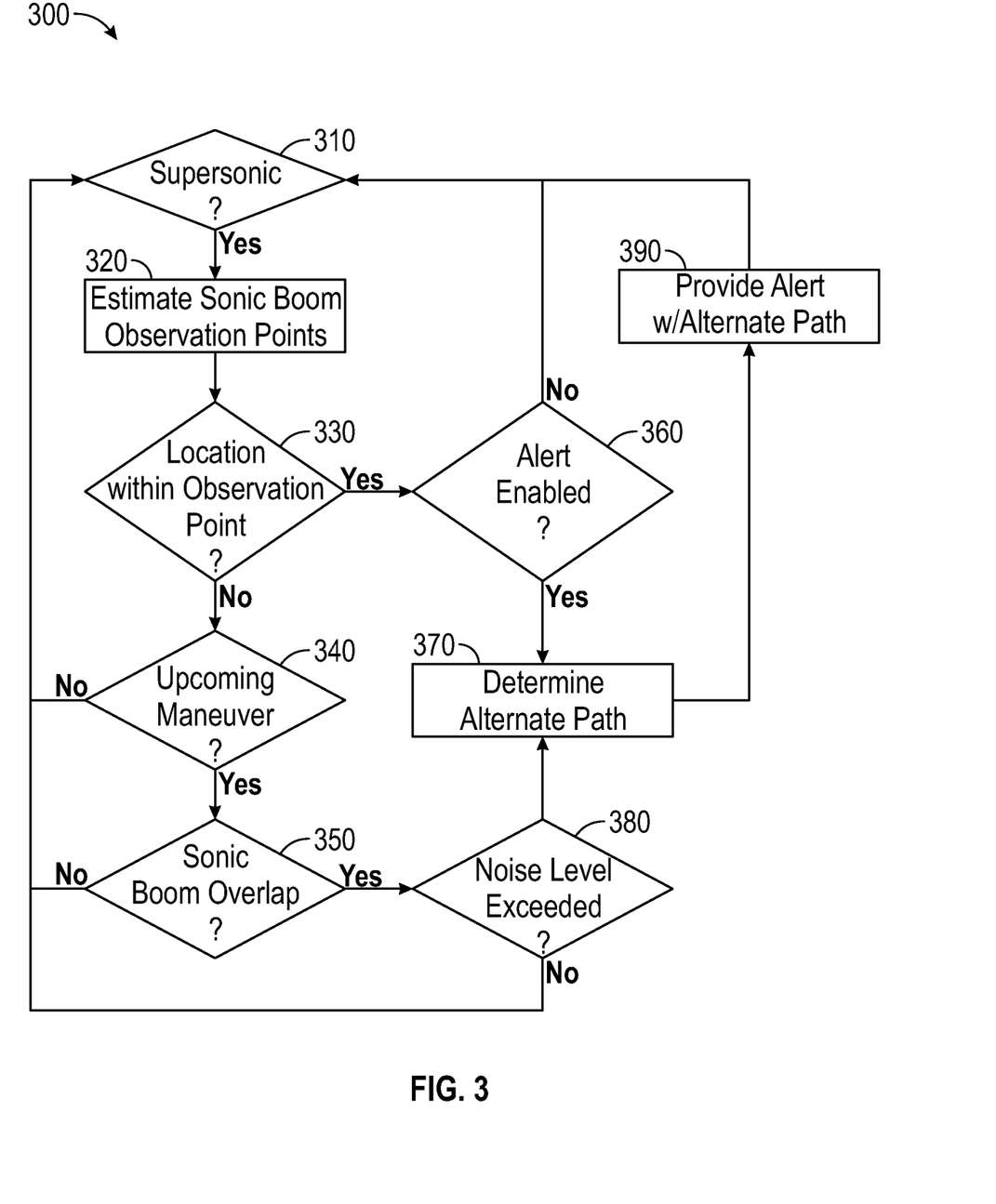
FIG. 3 is a flow diagram illustrating a non-limiting embodiment of a method for performing a supersonic flight navigation system in accordance with the teachings of the present disclosure.

Turning now to FIG. 3, a flow diagram illustrating a non-limiting embodiment of a method 300 of providing the supersonic flight navigation in accordance with the teachings of the present disclosure is shown. The method is first operative to detect 310 if an aircraft is expected to be travelling at or above supersonic speeds according to the planned flight plan. Aircraft speed may be detected in response to data from an airspeed sensor, GPS or AHRS. If the aircraft is not expected to be travelling at supersonic speeds, the method continues to periodically monitor airspeeds to determine if the aircraft reaches, or is expected to reach, supersonic speeds. If supersonic speeds are expected, reached or exceeded, the method is then operative to estimate 320 resulting sonic boom observation points and magnitudes at ground locations along the flight path. The magnitude of the noise experienced at the sonic boom observation points depend on the size and shape of the aircraft, velocity and altitude of the aircraft and atmospheric conditions. As the aircraft increases in altitude, the width of the sonic boom observation curve decreases. Also with an increase in velocity, the resulting sonic boom cone angle decreases resulting in a lower noise magnitude at the observation points.

Once determining locations and magnitudes for sonic boom observation points, the method is next configured to compare 330 these observation points to ground locations having supersonic flight noise restrictions or limitations. The supersonic flight noise restrictions and corresponding locations may be received from a ground-based data service, or may be stored in a memory within the aircraft and updated periodically, or both. If the estimated sonic boom level exceeds a supersonic flight noise restriction at an upcoming location, the method is then configured to check 360 if an alert system within the cockpit is enabled by the pilot or other crew member. If the alert system is disabled, the method is then configured to return to periodically determining 310 if the aircraft is travelling at supersonic speeds.

If an alert system is enabled, the method may then be operative to determine 370 an alternate flight path, alternate flight velocity or altitude, to avoid the upcoming location with the supersonic flight noise restriction. After determining an alternate flight path, velocity and/or altitude, the method is then configured to provide 390 an alert to the pilot indicative of the upcoming supersonic noise restriction and/or the alternate path, velocity, and/or altitude. These alerts should be provided to the pilot such that the pilot has sufficient time to execute the suggested maneuvers, and/or, gain permission from the appropriate air traffic control authority to perform the suggested maneuvers.

In one exemplary embodiment, if the aircraft is performing the method with an autopilot engaged, the autopilot may automatically request a flight path change from an air traffic control authority in response to the estimation of an upcoming supersonic noise restriction and execute the suggested maneuver in response to permission received from the air traffic control authority. In this scenario, the method may also provide an alert to the pilot indicative of the upcoming supersonic noise restriction, suggested maneuver and approval by the appropriate air traffic control authority. The autopilot may then execute the suggested maneuver after providing the alert or after receiving a confirmation from the pilot to perform the suggested maneuver. In an exemplary embodiment, the suggested maneuver may be to reduce the velocity of the aircraft until the sonic boom observation contour has cleared the location with the supersonic noise restriction and then to resume supersonic flight at the prior velocity.

If the observation contour and estimated boom carpet do not encompass upcoming areas with supersonic flight noise limits less than the estimated sonic boom noise level, the method may then be configured to determine 340 if there is an upcoming flight maneuver planned. If there is no upcoming flight maneuver planned, for example, the aircraft will be traveling directly between waypoints at a supersonic speed during a predetermined upcoming time duration, the method is then operative to return to periodically monitoring 310 of the aircraft is expected to travel at a supersonic speed and subsequently repeating the exemplary method if the supersonic speed is expected or exceeded.

If an upcoming flight maneuver is planned, the method is then operative to determine if a resulting sonic boom observation contour would overlap with a prior sonic boom observation contour resulting in a focus boom having a sound magnitude resulting from the combined sound pressures of the two sonic booms wave fronts. For example, a change in altitude may not result in observation contour overlap, but a turn and dive of the aircraft may result in an overlap. If no overlap is predicted, the method is then operative to return to periodically monitoring 310 if the aircraft is expected to travel or is travelling at a supersonic speed.

If an overlap of observation contours is predicted which may result in a focus boom, the method is then operative to estimate the predicted focus boom sound magnitude and compare this with supersonic flight noise limits at the predicted focus boom location to predict 380 if the noise level will be exceeded. If the predicted focus boom noise level will not exceed the limit, the method is then operative to return to periodically monitoring 310 if the aircraft is travelling at a supersonic speed. If the predicted focus boom noise level will exceed the supersonic flight noise limits at the predicted focus boom location, the method is then operative to determine 370 an alternate flight path, alternate flight velocity or altitude, to avoid the upcoming location with the supersonic flight noise restriction. After determining an alternate flight path, velocity and/or altitude, the method is then configured to provide 390 an alert to the pilot indicative of the upcoming supersonic noise restriction and/or the alternate path, velocity, and/or altitude. These alerts should be provided to the pilot such that the pilot has sufficient time to execute the suggested maneuvers, and/or, gain permission from the appropriate air traffic control authority to perform the suggested maneuvers.

Figure 4:
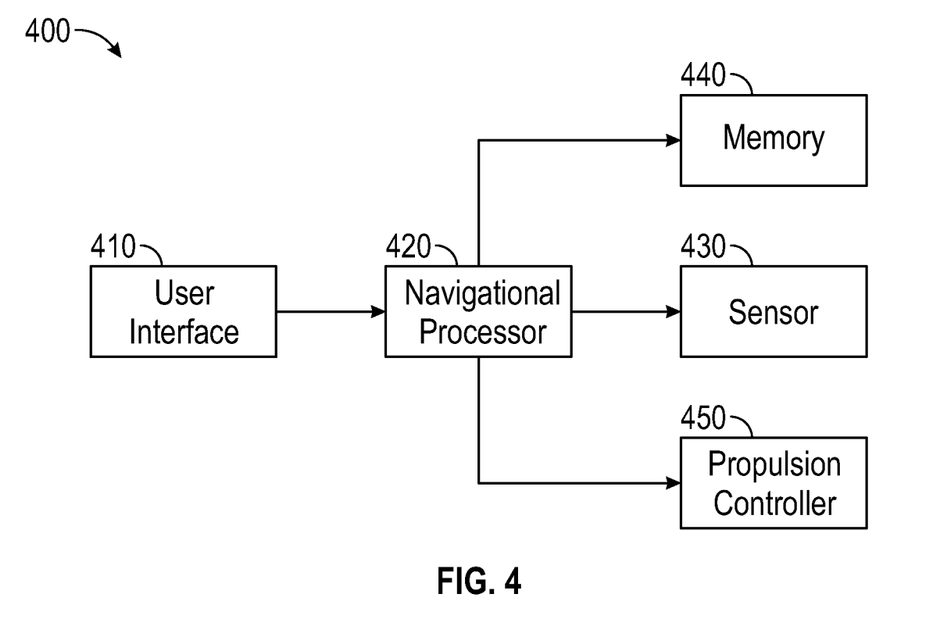
FIG. 4 is a simplified block diagram illustrating another non-limiting embodiment of a system for a supersonic flight navigation system in accordance with the present disclosure.

Turning now to FIG. 4, a block diagram illustrating a system 400 for providing the supersonic flight navigation in accordance with the teachings of the present disclosure is shown. The exemplary system 400 may be an aircraft navigation system within an aircraft including a user interface 410, a sensor 430, a memory 440, a navigational processor 420, and a propulsion controller 450. In this exemplary system 400, the user interface 410 may be configured for displaying a navigational route, a portion of a navigational route, such as a next waypoint and heading change, and/or one or more of a plurality of alerts. In particular, the user interface 410 may be configured for displaying an alert generated by the navigational processor 420 indicative of a prediction of an aircraft generated sound level exceeding a geographically based noise limit. The user interface may further display an initial navigational route and an alternate navigational route wherein the alternate navigational route is generated in response to the predicted aircraft generated sound level exceeding the noise limit for the geographical location along the initial navigational route.

The exemplary system may further include a sensor 430 for detecting a heading of the aircraft, an altitude of the aircraft and a velocity of the aircraft. In one exemplary embodiment, the sensor is an attitude heading and reference system (AHRS). Data generated by the sensor 430 may be directly coupled to a navigational processor 420 or may be stored in a memory 440 for later retrieval by the navigational processor 420. The memory 440 may further be configured for storing a noise limit for a geographical location. The noise limit may be indicative of a location having a restriction on a pressure wave, or sonic boom, generated by an aircraft operating at supersonic speeds. In one exemplary embodiment, the memory 440 may store a data indicative of population density. The data indicative of population density may be used to ensure that a proposed routing does not preclude a sonic boom from being positioned above a population center.

The navigational processor 420 may be configured to determine the initial navigational route, estimate a sound level at the geographical location in response to a first sound pressure wave estimated to be generated by the aircraft at a first point along the initial navigational route and a second sound pressure wave generated by the aircraft at a second point along the initial navigational route. In an exemplary embodiment, the aircraft may be estimated to be travelling at a supersonic velocity at the first point along the initial navigational route and the second point along the initial navigational route. In addition, there may be planned change of the heading of the aircraft between the first point along the initial navigational route and the second point along the initial navigational route which may result in an overlap of the first sound pressure wave and the second sound pressure wave. In an exemplary embodiment, the initial navigational route may consider the population density stored in the memory 440.

The navigational processor 420 may then be operative to determine an alternate navigational route in response to the sound level exceeding the noise limit and providing the alternate navigational route and an alert to the user interface for display to a pilot or the like. In one exemplary embodiment, the alternate navigational route may be determined to avoid an overlap of the first sound pressure wave and the second sound pressure wave at the geographical location resulting in a focus boom. The navigational processor 420 may further generate a control signal to couple to an aircraft propulsion controller 450 to modify the velocity of the aircraft in response to the sound level exceeding the noise limit.

In another exemplary embodiment, the system 400 is an aircraft navigation system for guiding a supersonic aircraft traveling between an origin and a destination, a portion of which may correspond to a supersonic portion of the route. The navigational processor 420 may be configured to calculate a route between the origin and the destination and to estimate a sound level in response to the supersonic portion of the navigational route. In this exemplary embodiment, the supersonic portion of the route may be determined by the navigational processor 420 based on population information and the estimated sound level at the populated locations along the route. In one exemplary embodiment the navigational processor 420 may be configured to include or avoid a geographical region disposed between the origin and the destination when the geographical region has a population density above a predetermined population density when calculating the route. Alternatively, the navigational processor 420 may be configured to include or avoid a geographical region disposed between the origin and the destination when the geographical region has a population density below a predetermined population density when calculating the route. In addition or alternatively, the navigational processor 420 may be configured to one of avoid and include a geographical region disposed between the origin and the destination when estimated sound level exceeds a noise limit associated with the geographical region. In another exemplary embodiment, the navigational system may perform the sound level calculations and route adjustments in real-time, on demand, as needed by the pilot. For example, if an air traffic controller diverts the aircraft for some reason, or the pilot changes course due to bad weather, then the exemplary navigational system may recompute the flight path and create a new route based not only on vectoring away from weather but also to ensure no booms/focus booms reach population centers.

The exemplary navigation system 400 may include an electronic storage device, such as a memory 440, configured to store population information relating to a density of a human population disposed between an origin location and a destination. The navigational processor 420 may be communicatively coupled with the electronic storage device such that the navigational processor 420 may obtain the population information from the electronic storage device. The exemplary system may further include a sensor 430, such as an AHRS, configured to sense a condition of the supersonic aircraft and to generate condition information based on the condition of the aircraft. The navigational processor 420 is then communicatively coupled with the sensor 430 and is configured to receive the condition information and to recalculate the supersonic portion of the route based on the condition information. In one exemplary embodiment, the sensor 430 may be configured to sense one of a weight, a speed, and an orientation of the supersonic aircraft. After the navigational route has been generated, the exemplary navigational processor 420 may be further configured to at least one of output the route to a pilot of the supersonic aircraft, to a flight management system of the supersonic aircraft, to an autopilot system of the supersonic aircraft, and/or to control the supersonic aircraft to follow the route.

Figure 5:
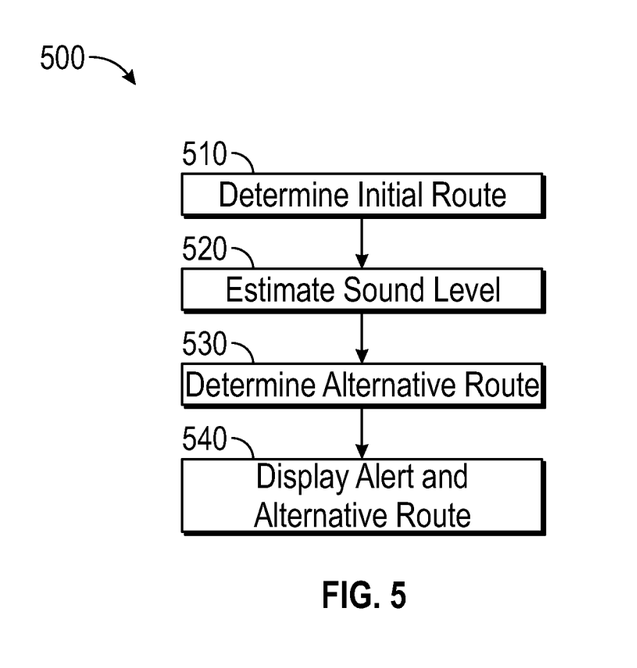
FIG. 5 is a flow diagram illustrating another non-limiting embodiment of a method for implementing a supersonic flight navigation system in accordance with the teachings of the present disclosure.

Turning now to FIG. 5, a flow diagram illustrating a non-limiting embodiment of a method 500 of providing the hybrid jet electric aircraft operation in accordance with the teachings of the present disclosure is shown. The method is first operative to determine 510 an initial navigational route. The initial navigational route may be determined between an origin point and a destination, including a number of waypoints, by an aircraft navigational processor or the like. The initial navigational route may be determined in response to a user input flight plan having an origin point and a destination, as well as a number of waypoints between the origin point and the destination. The initial navigational route may include flight information such as airspeed, altitude and heading between the waypoints. In this exemplary method, the aircraft may be estimated to be travelling at a supersonic velocity at the first point along the initial navigational route and the second point along the initial navigational route wherein the initial navigational route may include a planned change of a heading of the aircraft between the first point along the initial navigational route and the second point along the initial navigational route while the aircraft is travelling at the supersonic velocity.

The method is next operative to estimate 520, by the aircraft navigational processor, the sound level at the geographical location in response to a first sound pressure wave estimated to be generated by the aircraft at a first point along the initial navigational route and a second sound pressure wave generated by the aircraft at a second point along the initial navigational route. In this exemplary embodiment, the first sound pressure wave may be estimated to be generated while the aircraft is travelling at a supersonic speed at a first heading and the second sound pressure wave may be estimated to be generated while the aircraft is travelling at a supersonic speed at a second heading. In this example, the observation contours of a sonic boom generated by the aircraft at the first heading and the second heading may overlap, thereby combining the pressures of the two sonic booms at the overlapping location. Thus, the first sound pressure wave and the second sound pressure wave may combine at the geographical location to generate a focus boom.

The method is next operative for determining 530, by the aircraft navigational processor, an alternate navigational route in response to the sound level exceeding a noise limit at the geographical location; and the alternate navigational route is determined to avoid an overlap of the first sound pressure wave and the second sound pressure wave at the geographical location. The alternate navigational route may be determined in order to minimize the sound levels at the geographical location resulting from the focus boom. The alternate navigational route may be chosen to avoid the geographical location, or the alternate navigational route may be chosen to adjust aircraft operation, such as by adjusting velocity, or delaying a planned maneuver, in order to reduce the sound levels experienced at the geographical location. The method may then be operative to display 540, by a user interface or the like, the alternate navigational route and an alert indicative of the sound level exceeding the noise limit. In one exemplary embodiment, the method may provide an audio notification or alert to the pilot indicative of the estimated sound level exceeding the noise limit for an upcoming geographical location.

In one exemplary embodiment, the method may be configured for estimating a sound level at an upcoming geographical location in response to a current flight characteristic of the aircraft. For example, the method may detect by a sensor, a heading of the aircraft, an altitude of the aircraft and a velocity of the aircraft, such as via an AHRS, and use this information to estimate noise levels at upcoming geographical locations along the planned navigational route. In addition, the method may be further enabled to generate a control signal, by the aircraft navigational processor or the like, to modify the velocity of the aircraft in response to the sound level exceeding the noise limit and coupling the control signal to an aircraft propulsion controller.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:
1. An aircraft navigation system comprising:
a user interface configured to display at least one of an alert, an initial navigational route and an alternate navigational route;
a sensor for detecting a heading of an aircraft, an altitude of the aircraft and a velocity of the aircraft;

a memory configured for storing information indicative of a noise limit for a geographical location; and a processor configured to determine the initial navigational route, to determine an initial flight maneuver within the initial navigational route, to estimate a sound level at the geographical location in response to an overlap between a first predicted pressure contour generated before the initial flight maneuver and a second predicted pressure contour generated after the initial flight maneuver, and to determine an alternate flight maneuver in response to the sound level exceeding the noise limit for the geographical location, to generate a control signal to modify the velocity of the aircraft in response to the sound level exceeding the noise limit, and to provide the alternate navigational route in response to the alternate flight maneuver and an alert to the user interface.

2. The aircraft navigation system of claim 1 wherein the sensor is an attitude heading and reference system.

3. The aircraft navigation system of claim 1 wherein the processor is configured to determine the alternate navigational route to avoid the occurrence of a focus boom at the geographical location resulting from the overlap between the first predicted pressure contour generated before the initial flight maneuver and the second predicted pressure contour generated after the initial flight maneuver.

4. The aircraft navigation system of claim 1 wherein the sound level at the geographical location is estimated in response to a first sound pressure wave estimated to be generated by the aircraft at a first point along the initial navigational route and a second sound pressure wave generated by the aircraft at a second point along the initial navigational route.

5. The aircraft navigation system of claim 4 wherein the aircraft comprises a supersonic aircraft travelling at a supersonic velocity at the first point along the initial navigational route and the second point along the initial navigational route.

6. The aircraft navigation system of claim 4 wherein there is a planned change of the heading of the aircraft between the first point along the initial navigational route and the second point along the initial navigational route.

7. A method for controlling an aircraft in response to an estimation of a sound level at a geographical location comprising:
determining, by a processor on board the aircraft, an initial navigational route;
determining, by the processor, an initial flight maneuver within the initial navigational route,
estimating, by the processor, the sound level at the geographical location in response to an overlap between a first predicted sonic boom pressure contour generated before the initial flight maneuver and a second predicted sonic boom pressure contour generated after the initial flight maneuver;
determining, by the processor, an alternate flight maneuver in response to the sound level exceeding a noise limit corresponding to the geographical location;
generating, by the processor, an alternate navigational route in response to the alternate flight maneuver and coupling the alternate navigational route to an aircraft propulsion controller and a control signal to modify the velocity of the aircraft in response to the sound level exceeding the noise limit; and
displaying, by a user interface, the alternate navigational route to avoid the geographical location and an alert indicative of the sound level exceeding the noise limit.

8. The method for estimating the sound level at the geographical location of claim 7 further including detecting, by a sensor, a heading of the aircraft, an altitude of the aircraft and a velocity of the aircraft, and wherein the sensor is an attitude heading and reference system.

9. The method for estimating the sound level at the geographical location of claim 7 wherein the alternate navigational route is determined to avoid an occurrence of a focus boom at the geographical location.

10. The method for estimating the sound level at the geographical location of claim 7 wherein the sound level at the geographical location is estimated in response to a first sound pressure wave estimated to be generated by the aircraft at a first point along the initial navigational route and a second sound pressure wave generated by the aircraft at a second point along the initial navigational route.

11. The method for estimating the sound level at the geographical location of claim 10 wherein the aircraft comprises a supersonic aircraft travelling at a supersonic velocity at the first point along the initial navigational route and the second point along the initial navigational route.

12. The method for estimating the sound level at the geographical location of claim 10 wherein the initial navigation route includes including a planned change of a heading of the aircraft between the first point along the initial navigational route and the second point along the initial navigational route.

13. A navigation system for guiding a supersonic aircraft traveling between an origin and a destination, the navigation system comprising:
an electronic storage device configured to store population information relating to a density of a human population at a geographic location disposed between an origin location and a destination; and
a processor communicatively coupled with the electronic storage device, the processor configured to obtain the population information from the electronic second device, to determine an initial navigational route between the origin location and the destination, to determine an initial flight maneuver within the initial navigational route, to estimate a sound level at the geographical location in response to an overlap between a first predicted sonic boom pressure contour generated before the initial flight maneuver and a second predicted sonic boom pressure contour generated after the initial flight maneuver, the processor further configured to calculate an alternate flight maneuver in response to the sound level exceeding a noise limit for the geographical location, to generate an alternative navigation route between the origin and the destination in response to the alternate flight maneuver, to generate a control signal to modify the velocity of the aircraft in response to the sound level exceeding the noise limit, and processor still further configured to:
output the alternate navigational route to a pilot of the supersonic aircraft,
output the alternate navigational route to a flight management system of the supersonic aircraft,
output the alternate navigational route to an autopilot system of the supersonic aircraft; and
control the supersonic aircraft to follow the alternate navigational route.

14. The navigation system of claim 13, wherein the processor is configured to avoid the geographical region disposed between the origin and the destination when the geographical region has a population density above a predetermined population density when calculating the route.

15. The navigation system of claim 13, wherein the processor is configured to include an alternate geographical region disposed between the origin and the destination when the alternate geographical region has a population density below a predetermined population density when calculating the route.

16. The navigation system of claim 13, further comprising a sensor configured to sense a condition of the supersonic aircraft and to generate condition information based on the condition of the aircraft, wherein the processor is communicatively coupled with the sensor and is configured to receive the condition information and to recalculate the initial navigational route based on the condition information.

17. The navigation system of claim 16, wherein the sensor is configured to sense one of a weight, a speed, and an orientation of the supersonic aircraft.

18. The navigational system of claim 13 wherein, the processor is configured to modify the velocity of the aircraft when the estimated sound level exceeds the noise limit associated with the geographical region.

\* \* \* \* \*